United States Patent [19]
Fyson

[11] Patent Number: 5,719,010
[45] Date of Patent: Feb. 17, 1998

[54] TREATMENT METHOD FOR TREATING EFFLUENTS FROM A PHOTOGRAPHIC DEVELOPMENT PROCESS

[75] Inventor: John Richard Fyson, Hackney, United Kingdom

[73] Assignee: Eastman Kodak Company, Rochester, N.Y.

[21] Appl. No.: 741,150

[22] Filed: Oct. 29, 1996

[30] Foreign Application Priority Data

Dec. 16, 1995 [GB] United Kingdom ............ 95025771

[51] Int. Cl.⁶ ................ G03C 5/31; G03C 5/395; G03C 7/44
[52] U.S. Cl. ................ 430/398; 430/399; 430/400
[58] Field of Search ................ 430/398, 399, 430/400

[56] References Cited

U.S. PATENT DOCUMENTS

| | | | |
|---|---|---|---|
| 3,674,490 | 7/1972 | Matejec | 430/376 |
| 3,765,891 | 10/1973 | Travis | 430/351 |
| 5,171,658 | 12/1992 | Fyson | 430/393 |

FOREIGN PATENT DOCUMENTS

| | | |
|---|---|---|
| 1403418 | 8/1975 | United Kingdom . |
| 1560572 | 2/1980 | United Kingdom . |
| 92/04282 | 3/1992 | WIPO . |
| 92/07300 | 4/1992 | WIPO . |

*Primary Examiner*—Hoa Van Le
*Attorney, Agent, or Firm*—John R. Everett

[57] ABSTRACT

The present invention relates to a treatment method for treating effluents from a photographic development process, particularly a redox amplification (RX) development process, which is operated at an alkaline pH and is buffered with a phosphate buffer, said treatment method being characterized by the addition to the effluents of a Group II or Group III metal cation which forms an aqueous insoluble or substantially insoluble phosphate salt, thereby to precipitate phosphate salt from the effluent, and to reduce the pH of the effluent.

25 Claims, No Drawings

TREATMENT METHOD FOR TREATING EFFLUENTS FROM A PHOTOGRAPHIC DEVELOPMENT PROCESS

FIELD OF THE INVENTION

The present invention relates to a treatment method for treating effluents from a photographic development process, particularly a redox amplification (RX) development process. The treatment method of the present invention can be applied to individual stages of the process separately, or the effluents from each stage can be combined together, and the treatment method applied to the combined effluents.

BACKGROUND OF THE INVENTION

At the time of writing, RX development processes are known in the photographic art but are not used commercially. They are particularly useful for processing colour photographic papers. In such processes, the photographic materials on which images are to be captured comprise silver halide emulsions which have significantly lower lay-down densities of silver halide as compared with silver halide emulsions used in conventional (non-amplified) development processes; for paper applications the silver halide normally employed is silver chloride.

Redox amplification processes have been described in GB-A-1268126, GB-A-1399481, GB-A-1560572, and GB-A-1403418. GB-A-1560572, for example, discloses silver coverages of up to 3.25 mg/dm$^2$, preferably from 0.001 to 3.25 mg/dm$^2$ and more preferably from 0.01 to 1.6 mg/dm$^2$ for use in RX processes.

Cobalt(III) complexes have been used in RX processes to oxidise phenylenediamine colour developers in the presence of image-wise exposed silver halide grains. Although peroxy amplifiers were proposed as early as 1972 in GB-A-1268126, the inherent instability of hydrogen peroxide has meant that cobalt (III) has been the preferred oxidising agent until relatively recently.

It is well known that colour developers require for their operation alkaline conditions, and for this reason, hydrogen peroxide amplifier-developers for RX processes have been buffered as alkaline solutions using carbonate or bicarbonate buffers. More recently it has been found that the stability of hydrogen peroxide RX developer solutions is improved if their pH is increased to 11.0 or more. For this phosphate buffers may be employed.

Alkaline sulphite fixers and peroxide bleaches for use in conjunction with RX developers have also been disclosed in the prior art; see for example WO-A-90/13060 and WO-A-92/07300.

Whilst the disposal of photographic effluents containing hydrogen peroxide/phosphate is more acceptable from an environmental point of view as compared with the disposal of cobalt solutions, the former is undesirable in view of the alkalinity of the solutions as discussed above, and as bulk disposal of phosphates leads to eutrophy of lakes and other bodies of water at sewage outfalls. The concentration of phosphates in photo-effluents from the combined overflow of the tank can be up to about 6000 ppm (measured as phosphorus).

PROBLEM TO BE SOLVED BY THE INVENTION

Accordingly, there is a requirement for a treatment method for treating effluents from photographic development processes, including developer, bleach and fixer effluents, which method can significantly reduce the phosphate contents of the effluents and can also reduce the pH of the effluents to an acceptable level for disposal, towards pH 7.0. Furthermore it would be desirable for such treatment method to be susceptible of being employed as a single step, particularly as part of an automated photographic development operation.

SUMMARY OF THE INVENTION

In one aspect of the present invention there is provided a treatment method for treating effluent from a photographic development process stage, particularly a redox amplification (RX) development process, which is operated at an alkaline pH and is buffered with a phosphate buffer, said treatment method being characterised by the addition to the effluent of a Group II or Group III metal cation which forms an aqueous insoluble or substantially insoluble phosphate salt, thereby to precipitate phosphate salt from the effluent, and to reduce the pH of the effluent. Thereafter the precipitate may be removed from the effluent.

According to another aspect of the invention there is provided a development method for the development of an image-wise exposed silver halide photographic emulsion comprising the steps of developing the emulsion, and thereafter bleaching and fixing, wherein at least one of the developing, bleaching and fixing stages comprises treatment with a phosphate buffered, alkaline treatment solution; characterised in that effluent from said at least one stage is treated using a treatment method in accordance with the present invention.

ADVANTAGEOUS EFFECT OF THE INVENTION

The present invention thus provides a treatment method for development effluents which can be used as a single step to reduce the pH of the effluents and to reduce the phosphates content thereof, so as to render the effluent more acceptable from an environmental stand-point for sewering in a public utilities sewerage system.

DETAILED DESCRIPTION OF THE INVENTION

The effluent treated may be from the developing, fixing or bleaching stages of a development process. In some embodiments the effluent from two or more of these stages may be combined and treated together. Preferably however the treatment method is carried out separately on at least the developer effluent.

The developer may have a pH in the range 9.0 to 14.0, preferably 10.0 to 12.0; for example a typical pH for an RX developer is 11.7. Said developer may be an RX type and in some embodiments include hydrogen peroxide as an oxidising agent for oxidising a phenylenediamine developing agent such as, for example, CD3 in the presence of image-wise exposed silver halide grains as catalyst. The high pH of the developer solution may assist in stabilising the solution.

The developing agent may be selected from p-phenylenediamines; typically the agent may be selected from:
4-amino N,N-diethylaniline hydrochloride,
4-amino-3-methyl-N,N-diethylaniline hydrochloride,
4-amino-3-methyl-N-ethyl-N-(2-methanesulfonamidoethyl) aniline sesquisulfate hydrate, (CD3)
4-amino-3-methyl-N-ethyl-N-(2-hydroxyethyl)aniline-sulfate, 4-amino-3-(2-methanesulfonamido ethyl)-N,N-diethyl-aniline hydrochloride and 4-amino-N-ethyl-N-(2-methoxyethyl)-m-toluidine di-p-toluene sulfonic acid.

As RX development processes are particularly suitable for print materials, the developing agent will typically be CD3.

The RX developer may contain from 0.5–10 ml/liter of 30% $H_2O_2$. Said RX developer may further comprise additional stabilising agents of the kind known in the art, including preservatives for protecting the peroxide from air or from premature reaction with the developing agent, and metal-sequestrating agents.

As preservatives may be employed one or more compounds selected from hydrazines, hydroxylamines, hydroxamic acids, oximes, nitrory radicals, hydrazides, phenols, saccharides, monoamines, dissines, tertiary amines, polyamines, quaternary ammonium salts, alpha-hydroxy ketones, alcohols, diamides and disulfonamides. The preferred antioxidants are hydroxylamine compounds, especially hydroxylamine itself. Many antioxidants are described in EP-A-0410375. The developer solution may also contain other compounds which increase its stability such, for example, as a long-chain compound which can adsorb silver, e.g. dodecylamine.

As metal-sequestrating agents may be used for example 1-hydroxyethylidene-1,1'-diphosphonic acid which is a chelating agent for nickel and manganese ions or diethyltriamine-pentaacetic acid which chelates inter alia with iron ions.

The treatment method of the invention may also be used for treating separately the fixing or bleaching effluents. The bleach may be a peroxide bleach comprising typically hydrogen peroxide, and may be buffered with a phosphate buffer at an alkaline pH in accordance with WO-A-92/07300.

Said fixing solution may comprise an alkali metal sulphite fixing agent in accordance with WO-A-90/13060, and further in accordance with that disclosure the fix may be worked at a pH greater than 6.0, typically 9.0.

The phosphate buffer used in the invention may be any suitable buffering agent which is known in the art, but byway of example only may be an alkali metal hydrogen phosphate e.g. dipotassiumhydrogen phosphate.

Said Group II or Group III metal cation may be selected from any such cation which forms an insoluble phosphate, but will typically be calcium or aluminium. In some embodiments magnesium or strontium may be used. Of course it is desirable that the cation selected should be environmentally acceptable for sewering.

The cation may be added in the treatment method in the form of an aqueous solution. In particular soluble metal halide salts may be used, such as, for example, the chlorides, bromides or iodides; the chloride salts have been found to be particularly useful. Particularly preferred reagents are calcium chloride and especially aluminium chloride.

The amount of precipitating agent added to the effluents is selected to ensure precipitation of a substantial proportion of the phosphates in the effluents, and also to reduce the pH of the effluents to an acceptable level. Of course what is acceptable will depend on the environment where the effluents are to be sewered. Nevertheless, as a rough guide, the pH should be reduced below about pH 9.0, and after treatment the pH should preferably be in the range 5.0–8.0, typically about 7.0.

Generally, the concentration of phosphates in the effluents should be reduced below the 4000 ppm as phosphorus level, preferably below 3000 ppm and ideally below 1000 ppm.

Typically, the treatment method of the invention may reduce the phosphates concentration of say an RX developer, having an initial concentration of about 6000.ppm phosphate, to about 700–800 ppm.

In a particular aspect of the invention the amount of cation added is selected to precipitate a desired proportion of the phosphate in the effluents and to reduce the pH of the effluents, without requiring any excess cation for either purpose. In other words, the amount added to reduce the pH to an acceptable level as described above should be about just enough to precipitate the required amount of phosphate, and vice versa.

Naturally the actual amount or volume of cation added will depend on the cation itself and, when used in solution, on the concentration of the solution used. Typically however up to about 50 ml of a 10–20% solution may be added per liter of effluent, preferably up to 20 ml and ideally 5–15 ml or an equivalent amount.

Following precipitation of the phosphate salt(s) in the effluent, the precipitate may be removed from the effluent in any convenient manner known to a person skilled in the art, such, for example, as by filtration or centrifugation.

Following is a description by way of example only of methods of carrying the present invention into effect.

An RX developer with the following formulation was made up:

| | |
|---|---|
| Dipotassium hydrogen phosphate | 40.0 g |
| Hydroxylamine sulphate | 1.0 g |
| CD3 | 4.5 g |
| Hydrogen peroxide (30%) | 2 ml |
| 1-hydroxyethylidene-1,1'-diphosphonic acid | 0.6 g |
| Diethyltriamine-pentaacetic acid | 2.0 g |
| Water to | 1 l |
| pH adjusted to 11.70 | |

To separate aliquots of 100 ml of this developer were added different treatment solutions as described in the table below. The mixtures were stirred for 10 minutes and then filtered. The level of phosphate was determined in the effluent filtrates by atomic absorption spectroscopy and the results included in the table. The pH of the final filtrate was also determined using a Radionmeter pH-meter fitted with a Corning glass electrode and a sleeved EIL reference electrode.

| Treatment | Phosphate (ppm P) | Final pH | |
|---|---|---|---|
| None | 5960 | 11.70 | Comp. |
| Add 12 ml water | 5315 | 11.69 | Comp. |
| Add 12 ml 20% aluminium chloride solution | 785 | 5.15 | Inv. |
| Add 10 ml 10% calcium chloride solution | 3730 | 11.41 | Inv. |
| Add 20 ml 10% calcium chloride solution | 2105 | 10.57 | Inv. |
| Add 30 ml 10% calcium chloride solution | 585 | 7.40 | Inv. |
| Add 20 ml 10% magnesium chloride solution | 413 | 11.06 | Inv. |
| Add 40 ml 10% strontium chloride solution | 982 | 10.63 | Inv. |

All treatments involving the addition of a group II or group III metal salt resulted in the reduction in phosphate content and could be used to reduce the phosphate in photo-effluent as described above. Simultaneously the pH was reduced. By a careful choice of the amount of addition considerable amounts of phosphate can be removed and at the same time the pH reduced towards more acceptable levels.

The invention has been described in detail with particular reference to certain preferred embodiments thereof, but it will be understood that variations and modifications can be effected within the spirit and scope of the invention.

I claim:

1. A treatment method for treating effluent from a photographic development process stage which is operated at an alkaline pH and is buffered with a phosphate buffer, said treatment method being characterised by the addition to the effluent of a Group II or Group III metal cation which forms an aqueous insoluble or substantially insoluble phosphate salt, thereby to precipitate phosphate salt from the effluent, and to reduce to the pH of the effluent.

2. A treatment method as claimed in claim 1 characterised by removing the precipitate from the effluent.

3. A treatment method as claimed in claim 1 or claim 2 characterised in that the effluents from two or more photographic development process stages are combined and treated together by the addition of said Group II or Group III metal cation.

4. A treatment method as claimed in claim 1 or claim 2 which is carried out separately on effluent from the development stage of the process.

5. A treatment method as claimed in claim 4 wherein the developer has a pH in the range 9.0–14.0.

6. A treatment method as claimed in claim 5 wherein the developer is of the RX type and includes hydrogen peroxide as an oxidising agent.

7. A treatment method as claimed in claim 6 wherein the developer contains 4-amino-3-methyl-N-ethyl-N-(2-methanesulfonamidoethyl)aniline sesquisulfate hydrate (CD3) as developing agent.

8. A treatment method as claimed in claim 7 wherein the developer contains about 0.5–10 ml/liter of about 30% hydrogen peroxide.

9. A treatment method as claimed in claim 8 wherein said developer further comprises one or more stabilising agents, preservatives for protecting the peroxide from air or from premature reaction with the developing agent, or metal-sequestrating agents.

10. A treatment method as claimed in claim 9 wherein the developer contains hydroxylamine as an anti-oxidant.

11. A treatment method as claimed in claim 1 wherein the developer contains 1-hydroxyethylidene-1,1'-diphosphonic acid or diethyltri-amine-pentaacetic acid as a metal-sequestrating agent.

12. A method as claimed in claim 1 or claim 2 which is carried out separately on effluent from the bleaching step of the development process.

13. A treatment method as claimed in claim 12 wherein the bleach comprises hydrogen peroxide.

14. A treatment method as claimed in claim 1 or claim 2 which is carried out separately on effluent from the fixing stage of the development process.

15. A method as claimed in claim 14 wherein the fixing agent comprises an alkaline metal sulfite.

16. A method as claimed in claim 1 wherein said Group II or Group III metal cation is selected from calcium and aluminium.

17. A treatment method as claimed in claim 1 wherein said Group II or Group III metal cation is selected from magnesium and strontium.

18. A treatment method as claimed in claim 1 wherein the metal cation is added in the form of an aqueous solution.

19. A treatment method as claimed in claim 1 wherein the Group II or Group III metal cation is added in the form of a soluble metal halide salt, particularly a chloride, bromide or iodide.

20. A treatment method as claimed in claim 19 wherein the Group II or Group III metal cation is added as a salt selected from calcium chloride and aluminium chloride.

21. A treatment method as claimed in claim 1 wherein the amount of precipitating agent added to the effluent is selected to ensure precipitation of a substantial proportion of the phosphate in the effluence, and also to reduce the pH of the effluent to an acceptance level.

22. A treatment method according to claim 1 wherein the phosphate buffer is an alkaline metal hydrogen phosphate.

23. A treatment method according to claim 22 wherein the pH is reduced below about pH 9.

24. A treatment method according to claim 22 wherein the concentration of phosphates in the effluent is reduced below 4000 ppm level measured as phosphorous.

25. A development method for the development of an image-wise exposed silver halide photographic emulsion comprising the steps of developing the emulsion, and thereafter bleaching and fixing, wherein at least one of the developing, bleaching and fixing stages comprises treatment with a phosphate buffered, alkaline treatment solution; characterized in that effluent from said at least one stage is(a) treated at an alkaline pH and (b) buffered with a phosphate buffer, said treatment method is characterized by the addition to the effluent of a Group II or Group III metal cation which forms an aqueous insoluble or substantially insoluble phosphate salt, thereby to precipitate phosphate salt from the effluent, and to reduce to the pH of the effluent.

* * * * *